United States Patent [19]

Hieda

[11] Patent Number: 4,936,913
[45] Date of Patent: Jun. 26, 1990

[54] ALUMINUM FLAKE PIGMENT

[75] Inventor: Takao Hieda, Nara, Japan

[73] Assignee: Toyo Aluminium Kabushiki Kaisha, Osaka, Japan

[21] Appl. No.: 234,723

[22] Filed: Aug. 22, 1988

[30] Foreign Application Priority Data

Aug. 25, 1987 [JP] Japan .................. 62-210715

[51] Int. Cl.$^5$ ............................................. C09C 1/64
[52] U.S. Cl. ..................................... 106/404; 75/954; 428/546
[58] Field of Search ........................... 75/251; 106/404

[56] References Cited

U.S. PATENT DOCUMENTS 3,901,688 8/1975 Casey et al. ............................ 75/251
3,941,584 3/1976 Tundermann et al. ............. 75/0.5 R
4,318,747 3/1982 Ishijima et al. ..................... 106/290

FOREIGN PATENT DOCUMENTS 706251 2/1954 United Kingdom .

OTHER PUBLICATIONS

Chemical Abstracts, Vl. 81, No. 14, Oct. 7, 1984, p. 94, Abstract No. 79479s.

Primary Examiner—John F. Niebing
Assistant Examiner—David W. Schumaker
Attorney, Agent, or Firm—Nixon & Vanderhye

[57] ABSTRACT

An aluminium flake pigment characterized in that the ratio of the average thickness of flakes to the average diameter of flakes is in the range of 0.025 to 0.3, preferably 0.028 to 0.1 and the ratio of the water covering area to the specific surface area is in the range of 0.18 to 0.4, preferably 0.19 to 0.35 is disclosed herein.

The aluminium flake pigment of the invention has the improved resistance to the circulation of the metallic paint during the painting.

3 Claims, 2 Drawing Sheets

ALUMINUM FLAKE PIGMENT

FIELD OF THE INVENTION

The invention relates to an aluminium flake pigment suitable for incorporating a metallic paint. More particularly, it relates to the aluminium flake pigment having the improved resistance to the circulation of the metallic paint during the painting.

BACKGROUND OF THE INVENTION

When the paint incorporating the aluminium flake pigment is applied to any article such as car, the paint is necessarily subjected to the circulation by any of the pumps for preventing the sedimentation of the pigment in the tank. However, the vigorous turbulent flow is caused near the pump due to the circulation and therefore the aluminium flakes are subjected to the excess impact so as to cause the collisions between the flakes and between the flakes and the inner wall of tank, thereby the aluminium flakes being bent and/or ruptured.

If the paint containing the bent flakes is employed, the resultant paint film will have the poor metallic brightness because the flakes in the paint film are oriented irregularly. And, if the paint containing the ruptured flakes is employed, the dark paint film will be formed because there are a great deal of the torn pieces of the ruptured flakes.

Accordingly, the aluminium flake pigment having the improved resistance to the circulation is requested.

SUMMARY OF THE INVENTION

The invention provides the aluminium flake pigment which is characterized in that the ratio of the average thickness of flakes (d; $\mu$m) to the average diameter of flakes ($D_{50}$; $\mu$m) is in the range of 0.025 to 0.3 and the ratio of the water covering area (WCA; $m^2/g$) to the specific surface area (SSA; $m^2/g$) is in the range of 0.18 to 0.4.

The aluminium flake pigment of the invention each ratio of which is in the above range has the improved resistance to the circulation together with the excellent brightness and the high mechanical strength.

DETAILED DESCRIPTION OF THE INVENTION

Figure 1:
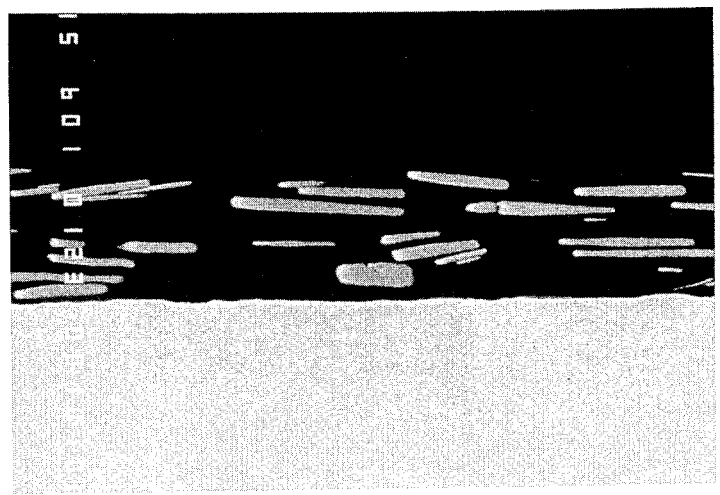
FIG. 1 is the scanning electron microscopic photograph ($\times$600) showing the cross section of the painted sheet prepared with the paint in which the aluminium flake pigment of Example 1 is incorporated after circulation.

The average thickness of flakes (d), the average diameter of flakes $D_{50}$), the water covering area (WCA) and the specific surface area (SSA) herein are defined as follows:

The average thickness of flakes (d, $\mu$m) is the value obtained by measuring the water covering area (WCA) per g of the metal content and then calculating according to the following equation.

$$d\ (\mu m) = 0.4\ (m^2 \times \mu m \times g^{-1}) / WCA\ (m^2 \times g^{-1})$$

Please refer to J. D. Edwards and R. I. Wray, Aluminium Paint and Powder (3rd Ed.), pp. 16 to 22, Reinhold Publishing Corp., New York(1955).

The average diameter of flakes ($D_{50}$, $\mu$m) is the value obtained by measuring with a Microtrac particle-size analyzer.

The water covering area (WCA; $m^2/g$) is the value obtained by measuring according to the method described in J. D. Edwards and R. I. Wray, Aluminium Paint and Powder (3rd Ed.), pp. 16 to 22, Reinhold Publishing Corp., New York(1955).

The specific surface area (SSA; $m^2/g$) is the value obtained by calculating the nitrogen gas volume adsorbed on the flake surface per g of flakes according to BET method.

In the invention, the aluminium flake pigment should have the ratio of the average thickness of flakes (d) to the average diameter of flakes ($D_{50}$) in the range of 0.025 to 0.3. When the flakes have the ratio $d/D_{50}$ of less than 0.025, the flakes will be easily bent and/or ruptured due to the circulation because they are very thin. The higher the ratio $d/D_{50}$ is, the lower the percentages of the flakes which are bent and/or ruptured due to the circulation are. When the flakes has the ratio $d/D_{50}$ of above 0.3, however, the flakes in the paint film are not regularly and in parallel oriented because each flake can move freely although the flakes have the high resistance to the circulation, thereby the resultant paint film will have the poor metallic brightness.

Preferably, the aluminium flake pigment in the invention has the ratio $d/D_{50}$ in the range of 0.028 to 0.1.

Further, the aluminium flake pigment in the invention should have the ratio of the water covering area (WCA; $m^2/g$) to the specific surface area (SSA; $m^2/g$) in the range of 0.18 to 0.4. As the observation of the flakes having the ratio WCA/SSA in the above range under the scanning electron microscope, it was found that most of the flakes have the rounded profiles and the uniform thickness throughout them and the finely divided powder or fragments are hardly attached on the flakes. The flakes of such a form are supposed to have higher resistance to circulation. While, according to the observation of the flakes having the ratio WCA/SSA of less than 0.18 under the scanning electron microscope, the flakes whose ends are very thinned such as the flakes having the corrugated profiles, the partially cracked and/or broken flakes and the flakes having the finely divided powder and/or broken fragments on their surfaces were observed, which are supposed to lack in the resistance to the circulation. The higher the ratio WCA/SSA is, the lower the percentages of the flakes which are bent and/or ruptured due to the circulation are. When the flakes have the ratio WCA/SSA of above 0.4, however, it is not suitable since the productivity of the aluminium flake pigment is unsatisfactory although the flakes have the high resistance to the circulation.

Preferably, the aluminium flake pigment in the invention has the ratio WCA/SSA in the range of 0.19 to 0.35.

The aluminium pigment of the invention can be particularly suitable for incorporating in paint. The aluminium pigment is mixed with any vehicle, any resin and other conventional additives to prepare the water or oily paint. Of course, other pigment(s) may be also incorporated in paint.

Further, the aluminium pigment of the invention can be incorporated in inks, adhesives, the resins and the like.

The aluminium flake pigment of the invention is prepared according to any of the known processes for preparing the metal powder pigment.

The aluminium powder used as the starting material is selected among the commercially available aluminium powder according to the intended tint. If the higher brightness is intended, extracoarse aluminium powder is selected. If the lower brightness, on the other hand, fine aluminium powder is selected. The commercially available aluminium powder can be classified according to roughness into four groups (extracoarse, coarse, medium and fine). The extracoarse aluminium powder has the larger average thickness (d) and average diameter ($D_{50}$) as well as the smaller water covering area (WCA) and specific surface area (SSA). Conversely, the fine aluminium powder has the smaller average thickness (d) and average diameter $D_{50}$ as well as the larger water covering area (WCA) and specific surface area (SSA).

The aluminium powder is milled according to a dry or wet milling process. Preferably, the aluminium powder is ground together with the grinding medium such as mineral spirit and if necessary other grinding additives in suitable mill such as ball mill, hammer mill, rod mill and the like under carefully controlled grinding conditions until the desired aluminium flakes are obtained. The rotation speed of mill and the grinding time are varied depending on the desired characteristics of flakes. Generally, the rotation speed of mill is selected in the range of 5 to 44 rpm and the grinding time is selected in the range of 1.5 to 15 hours. The temperature and pressure are not particularly limited.

If desired, the aluminium flake may be subjected to the standard leafing treatment.

EXAMPLES

The invention will now be further described by the following, non-limiting examples.

Example 1

Into the ball mill (inner diameter=500 mm, length=180 mm) containing 50 kg of steel balls each of which has a diameter of 2 mm, the formulation consisting of 1.0 kg of atomized aluminium spherical or spheroidal powder (Alcan MDX-81, ex Alcan Aluminium Ltd.), 5.0 ( of mineral spirit and 500 g of oleic acid was charged. Then, the charge in the mill was ground by operating the mill at 38 rpm (corresponding to 64 % of the critical rotation speed) for 3.5 hours.

After the grinding, the slurry in the mill was washed out with mineral spirit and subjected to the vibrating screens of 150, 350 and 400 mesh, successively. The liquid part of the passed-through slurry was removed through the pan filter. The resultant cake (NV=85%) was transferred into the kneader and kneaded for 1 hour so as to obtain the aluminium flake pigment (NV=80%).

Next, a paint was prepared from 34.3 parts by weight of aluminium flake pigment, 160.0 parts by weight of ALMATEX 100 (acrylic resin containing 50.0 % by weight of dry matter, ex MITSUI TOATSU CHEMICALS, INC.) and 33.3 parts by weight of UVAN 20SE-60 (melamine resin containing 60 % by weight of dry matter, ex MITSUI TOATSU CHEMICALS, INC.). The viscosity of the paint was adjusted with a mixed solvent of ethyl acetate, butyl acetate, xylene, Solvesso # 100 and Cellosolve acetate (mixed ratio by volume=30:10:30:20:10) so as to be 20 to 21 seconds on Ford cup # 4.

A portion of the above paint was subjected to a circulation (simulation test). That is, 300 g of the above paint was charged into a vessel provided with a jacket for circulating the cooling water and stirred by a stirrer with turbine blades for 1 hour.

The painted sheet was prepared employing the paint with or without subjecting to circulation as follows.

The paint was sprayed on polished mild steel sheet by automatic spraying machine so that the resultant paint film has a thickness of about 20 μm. Then, a clear coat was formed on this paint film according to procedures wet-on-wet coating followed by baking at 140° C. for 30 minutes.

The procedure of example 1 was repeated except that the grinding time was 1 hour.

Example 3

The procedure of example 1 was repeated except that as the atomized aluminium powder AB-5003 (ex TOYO ALUMINIUM K. K.) was used and the grinding time was 2.5 hours.

And, 19.1 parts by weight of aluminium flake pigment was used in the preparation of the paint.

Example 4

The procedure of example 1 was repeated except that as the atomized aluminium powder Alcan MDX-65 (ex Alcan Aluminium Ltd.) was used and the grinding time was 2.5 hours.

Example 5

The procedure of example 1 was repeated except that as the fine portion atomized aluminium powder Alcan MDX-65 (ex Alcan Aluminium Ltd.) was used and the grinding time was 5.5 hours.

And, 14.3 parts by weight of aluminium flake pigment was used in preparation of the paint.

Example 6

The procedure of example 1 was repeated except that as the atomized aluminium powder an equal mixed powder of fine portion of Alcan MDX-65 (ex Alcan Aluminium Ltd.) and AC-5005 (ex. TOYO ALUMINIUM K.K.) was used and the grinding time was 8 hours.

And, 9.5 parts by weight of aluminium flake pigment was used in the preparation of the paint.

Comparative Example 1

The extracoarse aluminium powder described in Japanese Pat. Application Laying-Open (KOKAI) No. 49-14358 was used, which is said to have the highest quality.

Comparative Example 2

The commercially available extracoarse aluminium powder (ex TOYO ALUMINIUM K.K.) was used.

Comparative Example 3

The commercially available coarse aluminium powder (ex TOYO ALUMINIUM K.K.) was used.

Comparative Example 4

The commercially available medium aluminium powder (ex TOYO ALUMINIUM K.K.) was used.

Comparative Example 5

The commercially available fine aluminium powder (ex TOYO ALUMINIUM K.K.) was used.

Test Example 1

The aluminium flake pigment (NV=80%) obtained in each Example and Comparative Example was subjected to the following tests.

test 1 water covering area (WCA)

The aluminium flake pigment was subjected to a leafing treatment by adding 1 g of stearic acid to 1 g of aluminium flake pigment and then heating with a small volume of xylene. The leafing flakes were dry-powdered with acetone to prepare the sample.

The water covering area of the thus-prepared sample was measured according to the method described in J. D. Edwards and R. I. Wray, Aluminium Paint and Powder (3rd Ed.), pp. 16 to 22, Reinhold Publishing Corp., New York(1955).

test 2 average thickness (d)

The average thickness of the above sample was calculated according to the above-mentioned equation based on the WCA value obtained in test 1.

test 3 average diameter $D_{50}$)

The average diameter of the above sample was determined with a Microtrac particle-size analyzer test 4 specific surface area (SSA)

The aluminium flake pigment was washed with a mixed solvent of ether and acetone and then dry-powdered with acetone to prepare the sample The specific surface area of the thus-prepared sample was calculated from the adsorbed nitrogen gas volume according to the BET method.

The test results are shown in Table 1.

TABLE 1

|  | WCA ($m^2$/g) | d ($\mu$m) | $D_{50}$ ($\mu$m) | d/$D_{50}$ (—) | SSA ($m^2$/g) | WCA/SSA (—) |
| --- | --- | --- | --- | --- | --- | --- |
| Example 1 | 0.15 | 2.7 | 34.9 | 0.077 | 0.80 | 0.188 |
| Example 2 | 0.10 | 4.00 | 16.0 | 0.250 | 0.56 | 0.180 |
| Comp. Example 1 | 0.36 | 0.89 | 29.8 | 0.030 | 2.25 | 0.160 |
| Comp. Example 2 | 0.50 | 0.80 | 31.4 | 0.025 | 2.90 | 0.172 |
| Example 3 | 0.50 | 0.80 | 15.5 | 0.052 | 1.45 | 0.345 |
| Example 4 | 0.80 | 0.50 | 15.9 | 0.031 | 3.35 | 0.239 |
| Comp. Example 3 | 0.90 | 0.44 | 23.9 | 0.019 | 3.92 | 0.230 |
| Example 5 | 1.20 | 0.33 | 11.2 | 0.029 | 3.90 | 0.308 |
| Comp. Example 4 | 1.33 | 0.30 | 17.6 | 0.017 | 4.48 | 0.297 |
| Example 6 | 1.70 | 0.24 | 8.5 | 0.028 | 5.49 | 0.310 |
| Comp. Example 5 | 1.60 | 0.25 | 14.0 | 0.018 | 6.20 | 0.258 |

Test Example 2

The painted sheet prepared in each Example and Comparative Example was subjected to the following tests.

test 5 brightness

The brightness of the painted sheet prepared with the paint before circulation was compared with that of the painted sheet prepared with the paint after circulation.

The brightness was measured according to the method described in Japanese Pat. Application Laying-Open (KOKAI) No.60-3016 by the TM-type goniophotometer (ex MURAKAMI COLOR RESEARCH LABORATORY), provided that the incidence angle was set at 45° and the oblique angle of the painted sheet was set at 5°.

test 6 number of bent flakes

The painted sheets prepared with the paint before and after the circulation were observed under the scanning electron microscope so as to count the number of the bent flakes per 100 flakes in the paint film.

The test results are shown in Table 2.

TABLE 2

|  | brightness | | | number of bent flakes | |
| --- | --- | --- | --- | --- | --- |
|  | circulation | | retention | circulation | |
|  | before | after | (%) | before | after |
| Example 1 | 190 | 180 | 95 | 0/100 | 0/100 |
| Example 2 | 160 | 155 | 97 | 0/100 | 0/100 |
| Comp. Example 1 | 170 | 94 | 55 | 2/100 | 23/100 |
| Comp. Example 2 | 157 | 80 | 51 | 4/100 | 30/100 |
| Example 3 | 186 | 184 | 99 | 0/100 | 2/100 |
| Example 4 | 179 | 166 | 93 | 0/100 | 5/100 |
| Comp. Example 3 | 156 | 126 | 81 | 2/100 | 17/100 |
| Example 5 | 153 | 152 | 99 | 0/100 | 2/100 |
| Comp. Example 4 | 153 | 103 | 67 | 2/100 | 10/100 |
| Example 6 | 98 | 96 | 98 | 0/100 | 2/100 |
| Comp. Example 5 | 95 | 83 | 87 | 8/100 | * |

*not determined because there were many bent and/or ruptured flakes.

Figure 2:
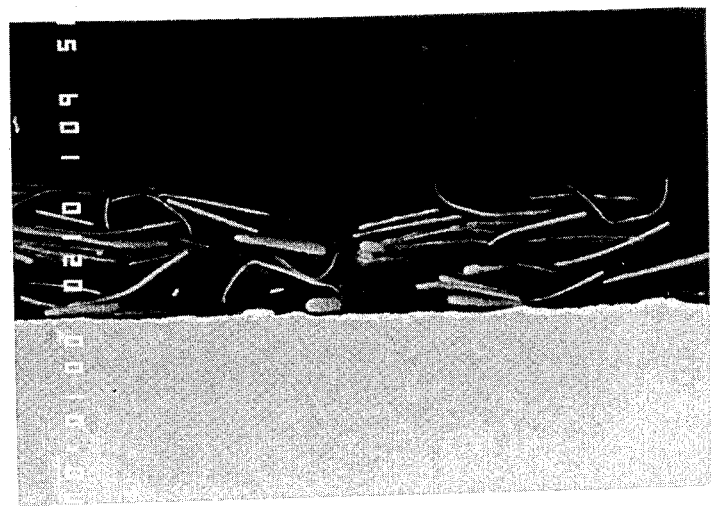
FIG. 2 is the scanning electron microscopic photograph ($\times$600) showing the cross section of the painted sheet prepared with the paint in which the aluminium flake pigment of Comparative Example 1 is incorporated after circulation.
Figure 3:
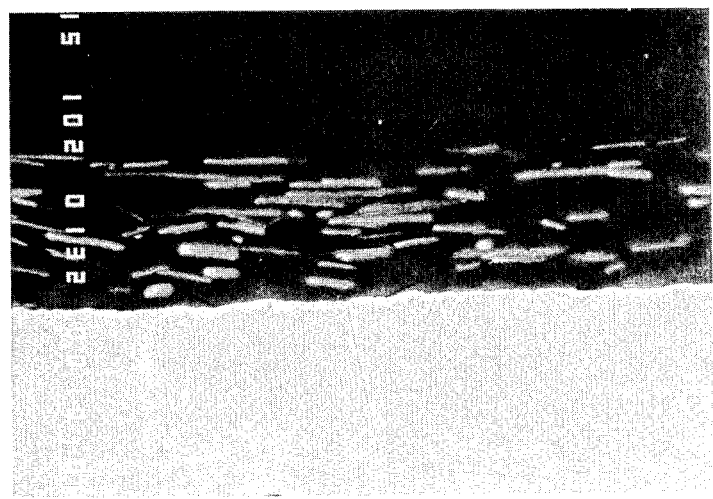
FIG. 3 is the scanning electron microscopic photograph ($\times$1000) showing the cross section of the painted sheet prepared with the paint in which the aluminium flake pigment of Example 5 is incorporated after the circulation.
Figure 4:
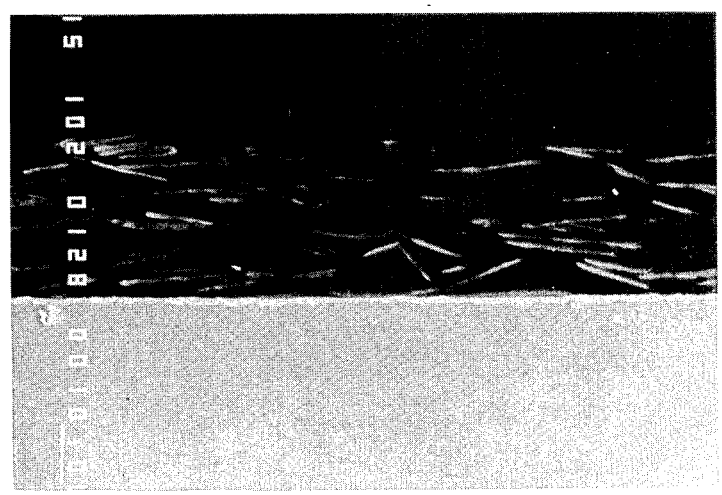
FIG. 4 is the scanning electron microscopic photograph ($\times$1000) showing the cross section of the painted sheet prepared with the paint in which the aluminium flake pigment of Comparative Example 4 is incorporated after the circulation.

The scanning electron microscopic photographs showing the cross sections of the painted sheets prepared with the paint after the circulation are shown in FIG. 1 to 4. FIG. 1 and FIG. 2 show the painted sheets in Example 1 and Comparative Example 1, respectively (×600). FIG. 3 and FIG. 4 show the printed sheet in Example 5 and Comparative Example 4 respectively (×1000).

EFFECT OF THE INVENTION

The aluminium flake pigment of the invention can retain the original brightness after subjecting to the circulation.

The bent and/or ruptured flakes are not substantially found in the paint film prepared with the paint incorporating the aluminium flake pigment of the invention.

The above effects are clear from the scanning electron microscopic photographs shown in Figures. Please note that the aluminium flakes are oriented regularly in the painted sheets shown in FIG. 1 and FIG. 3, while the aluminium flakes are oriented irregularly in the painted sheets shown in FIG. 2 and FIG. 4.

Accordingly, the aluminium flake pigment of the invention can be said to be very excellent in the resistance to the circulation.

I claim:

1. An aluminum flake pigment wherein the ratio of the average thickness of flakes to the average diameter of flakes is in the range of 0.025 to 0.3 and the ratio of the water covering area to the specific surface area is in the range of 0.18 to 0.4.

2. The pigment as claimed in claim 1 wherein the ratio of the average thickness of flakes to the average diameter of flakes is in the range of 0.028 to 0.1.

3. The pigment as claimed in claim 1, wherein the ratio of the water covering area to the specific surface area is in the range of 0.19 to 0.35.

* * * * *